(12) United States Patent
Christiansen et al.

(10) Patent No.: US 12,736,364 B2
(45) Date of Patent: Sep. 15, 2026

(54) RESIDUE SPREAD MAPPING

(71) Applicant: AGCO International GmbH, Neuhausen (CH)

(72) Inventors: Martin Peter Christiansen, Randers (DK); Ramon Buchaca Tarragona, Randers (DK); Morten Stigaard Laursen, Randers (DK); Esma Mujkic, Randers (DK)

(73) Assignee: AGCO International GmbH, Neuhausen (CH)

( * ) Notice: Subject to any disclaimer, the term of this patent is extended or adjusted under 35 U.S.C. 154(b) by 1079 days.

(21) Appl. No.: 17/806,052

(22) Filed: Jun. 8, 2022

(65) Prior Publication Data

US 2022/0397417 A1 Dec. 15, 2022

(30) Foreign Application Priority Data

Jun. 9, 2021 (GB) ..................................... 2108228

(51) Int. Cl.
*G01C 21/00* (2006.01)
*A01D 75/00* (2006.01)

(52) U.S. Cl.
CPC ......... *G01C 21/3807* (2020.08); *A01D 75/00* (2013.01); *G01C 21/3841* (2020.08)

(58) Field of Classification Search
CPC ........... G01C 21/3807; G01C 21/3841; A01D 75/00; A01D 41/1243; A01D 41/127; A01B 79/005
See application file for complete search history.

(56) References Cited

U.S. PATENT DOCUMENTS

| | | | |
|---|---|---|---|
| 5,569,081 A | 10/1996 | Baumgarten et al. | |
| 9,668,418 B2 | 6/2017 | Patton et al. | |
| 10,470,365 B2 | 11/2019 | Mahieu et al. | |

(Continued)

FOREIGN PATENT DOCUMENTS

| | | | |
|---|---|---|---|
| EP | 1790207 A1 | 5/2007 | |
| EP | 2382853 A2 * | 11/2011 | ........... A01B 79/005 |

(Continued)

OTHER PUBLICATIONS

UK Intellectual Property Office, Search report for UK Priority Application No. GB2108228.4, dated Mar. 25, 2022.

*Primary Examiner* — Scott A Browne
*Assistant Examiner* — Nazia Afrin

(57) ABSTRACT

Systems and methods for mapping the distribution of residue material in an environment in which one or more agricultural machines are operable. A sensing arrangement having one or more sensors mounted or otherwise coupled to an agricultural machine operating within the environment is used to obtain sensor data indicative of residue material spread by a spreader tool of the agricultural machine. From this a local distribution of residue material associated with the spreader tool is determined which is used to update a map of a global distribution of the residue material across the environment. The map comprises a grid-based map having a plurality of cells corresponding to sub-regions within the environment, wherein a value associated with each cell is representative of a measure of the residue material present within the corresponding sub-region.

18 Claims, 3 Drawing Sheets

(56) References Cited

U.S. PATENT DOCUMENTS

| | | | | |
|---|---|---|---|---|
| 2017/0086373 | A1 | 3/2017 | Background | |
| 2018/0310474 | A1* | 11/2018 | Posselius | A01D 41/127 |
| 2020/0120869 | A1 | 4/2020 | Vandike et al. | |
| 2021/0034867 | A1 | 2/2021 | Ferrari et al. | |

FOREIGN PATENT DOCUMENTS

| | | | | |
|---|---|---|---|---|
| EP | 3298880 | A1 | 3/2018 | |
| EP | 3494773 | A1 | 6/2019 | |
| EP | 3932172 | A1 | 1/2022 | |
| WO | WO-2016150728 | A1 * | 9/2016 | B60W 40/04 |
| WO | 2018/162699 | A1 | 9/2018 | |
| WO | WO-2019079205 | A1 * | 4/2019 | A01C 7/20 |

* cited by examiner

RESIDUE SPREAD MAPPING

TECHNICAL FIELD

The present invention relates, in general, to systems and methods for monitoring residue spread from a harvesting machine.

BACKGROUND

Agricultural combines work to cut crop material from a field before separating the grain from the material other than grain (MOG) (referred to interchangeably as "residue") on-board. Generally, the grain is transferred to a grain bin of the combine (where it may be temporarily stored) and the MOG is deposited back onto the field. A second operation may be performed to gather the deposited MOG, or the MOG may be used as a fertilizer for the soil in the field. In either case, it is important for the MOG to be distributed evenly during deposition, in order to ensure an efficient second harvesting operation (e.g. bailing of the MOG) or to ensure effective fertilization of the soil. When residue is unevenly distributed over a field, not only are exposed areas at risk for erosion, but inconsistencies in soil temperatures and moisture also may cause uneven plant emergence the following year, hurting yield. Ideally, residue should be spread consistently and managed to promote uniform rapid warming and drying in the spring for earlier planting and sufficient seed germination. It is also important not to spread MOG or residue into standing crop adjacent to the machine i.e. the crop to be harvested on the next pass by the machine as spreading into standing crop may result in the same area being spread twice causing an unwanted build up of residue in a given area, again leading to uniformity issues.

It is an aim to improve upon known systems such that the distribution of material from an agricultural machine can be monitored and optionally corrected more effectively and efficiently.

SUMMARY OF THE INVENTION

In an aspect of the invention there is provided a system for mapping the distribution of residue material in an environment in which one or more agricultural machines are operable, the system comprising: a sensing arrangement comprising one or more sensors mounted or otherwise coupled to an agricultural machine operating within the environment; and one or more controllers, configured to: receive sensor data from the one or more sensors indicative of residue material spread by a spreader tool of the agricultural machine; determine, from the sensor data, a local distribution of residue material associated with the spreader tool; and update a map of a global distribution of residue material across the environment in dependence on the local material distribution determined from the sensor data and the location of the agricultural machine, wherein the map comprises a grid-based map having a plurality of cells corresponding to sub-regions within the environment; and wherein a value associated with each cell is representative of a measure of residue material present within the corresponding sub-region.

Advantageously, the present invention provides means to map the distribution of material across an environment such that appropriate actions can be taken in dependence thereon. This may include appropriate corrective actions and/or adjusting control of a follow up agricultural operation (e.g. baling or the like) to account for the distribution of residue in the environment.

When used herein and throughout the specification the term "global distribution" is intended to cover the distribution of material across the mapped environment. This may be one or more harvested/harvestable fields, for example.

The sub-regions may be of a predefined size, and may preferably be of equal size across the environment. For example, each of the plurality of cells may correspond to a sub-region of a given area of the environment, which may be substantially square, for example. The plurality of cells may correspond to a sub region of approximately 1 $m^2$ in area, or at least 1 $m^2$, at least 4 $m^2$, at least 9 $m^2$, or at least 16 $m^2$, for example.

The one or more controllers may be operable to set the value of each cell in dependence on a harvested state of the field. For example, the one or more controllers may be operable to set the value of each cell at a base level, e.g. "0", for unharvested crop, or prior to the beginning of a harvesting operation.

The one or more controllers may be operable to increment the value of one or more cells of the map in dependence on the local material distribution. This may comprise incrementing the value of each cell corresponding to a sub-region where residue material is determined to have been spread into during a harvesting operation performed by the agricultural machine. The one or more controllers may be operable to increment the value of the cell(s) each time material is determined to have been spread, which may occur multiple times during an operation—e.g. during a pass of an adjacent crop row.

The one or more controllers may be operable to increment the value of the cell(s) by a predetermined amount for each determination that material has been spread into the corresponding sub-region of the environment. This may include incrementing the value by 1, for example. In some embodiments, the one or more controllers may be operable to increment the value of the cell(s) by an amount proportional to an amount of material determined to have been spread into the corresponding sub-region of the environment.

The system, e.g. the one or more controllers, may be operable to control one or more operating parameters of the agricultural machine or components thereof in dependence on the mapped distribution. For example, the one or more controllers may be operable to control operating parameters related to the spreading of material from the machine, e.g. of a spreader tool of the machine, to control when material is distributed therefrom. In embodiments, the one or more controllers may be configured to prevent distribution of material as the agricultural machine passes areas of the environment corresponding to sub regions where material has previously been spread, for example for sub-regions corresponding to cell(s) having a value above a threshold. This may advantageously prevent overlapping of material spread to prevent or at least reduce areas of significant residue material build up.

In embodiments, the system of the present aspect of the invention may be configured to control operation of a user interface, e.g. a display means, which may provide information, for example to an operator of the agricultural machine corresponding to the mapped distribution. This may comprise providing a graphical representation of the mapped distribution. The graphical representation may comprise a two-dimensional map of the environment with the sub-regions of the environment indicated. The sub-regions may be highlighted in colours, shades and/or patterns. For example, the sub-regions may be indicated in the representation with a colour which is dependent on the value of the corresponding cell of the mapped distribution. This may comprise a colour-scale corresponding to values between minimum and maximum values of the cells. Advantageously, the representation may provide an easily interpretable guide for an operator indicative of regions with higher and lower levels or residue build up. This may be used by an operator or a further control system for controlling one or more subsequent agricultural operations, such as corrective or collection operations.

The user interface may comprise a user interface of the agricultural machine, such as a user terminal provided in the machine, e.g. in an operator cab of the machine. The user interface may comprise a display on a remote device, such as a smartphone, tablet computer, computer or the like. The user interface may comprise a user terminal on one or more further machines operating in the environment. For example, the information relating to the mapped distribution may in this manner be provided to an operator of a further machine to inform subsequent agricultural operation.

The sensing arrangement may comprise an image sensor, such as a camera. The sensing arrangement may comprise a transceiver type sensor, having a transmitting component for transmitting a measurement signal and a receiving component for receiving reflected measurement signals. The sensor may comprise a RADAR sensor, LIDAR sensor, infrared sensor, or the like, for example. The sensing arrangement may comprise an ultrasonic sensor. The sensing arrangement may comprise multiple sensors, which may be of the same type or some combination of different sensor types.

The system may include or be communicably coupled to a position module. The position module may be operable to provide information relating to the location of an associated agricultural machine within or with respect to the mapped environment. The positioning module may comprise or be part of a positioning system, such as a Global Navigation Satellite System (GNSS), e.g. GPS, GLONASS, Galileo or the like, and/or a local positioning system for determining the location of the agricultural machine within the environment.

The system may include or be communicably coupled to an inertial measurement unit. The inertial measurement unit may be used to determine an orientation of the agricultural machine within the environment.

The system may comprise a distributed system. For example, one or more components of the system may be located off-board from the agricultural machine. This may include one or more of the controller(s). This may include a storage means having the mapped distribution stored therein. For example, the system may include a remote storage means, such as a remote server housing the mapped distribution.

The system may include multiple agricultural machines, each comprising one or more sensors for obtaining sensor data. Each of the multiple agricultural machines may be communicable with a central processing means having the one or more controllers for performing the processing steps of the invention.

In a further aspect of the invention there is provided a control system for mapping the distribution of residue material in an environment in which one or more agricultural machines are operable, the control system comprising one or more controllers, and being configured to: receive sensor data from a sensing arrangement comprising one or more sensors mounted or otherwise coupled to an agricultural machine operating within the environment, the sensor data being indicative of residue material spread by a spreader tool of the agricultural machine; determine, from the sensor data, a local distribution of residue material associated with the spreader tool; and update a map of a global distribution of residue material across the environment in dependence on the local material distribution determined from the sensor data and the location of the agricultural machine, wherein the map comprises a grid-based map having a plurality of cells corresponding to sub-regions within the environment; and wherein a value associated with each cell is representative of a measure of residue material present within the corresponding sub-region.

The one or more controllers may collectively comprise an input (e.g. an electronic input) for receiving one or more input signals indicative of the sensor data. The one or more controllers may collectively comprise one or more processors (e.g. electronic processors) operable to execute computer readable instructions for controlling operation of the control system, for example to determine the local distribution and/or update the global distribution. The one or more processors may be operable to generate one or more control signals, for example for controlling output of a graphical representation of the global distribution, or for controlling operation of one or more agricultural machines within the environment. The one or more controllers may collectively comprise an output (e.g. an electronic output) for outputting the one or more control signals.

The one or more controllers of the control system may be configured in any manner of the one or more controllers of the system described hereinabove with reference to the first aspect of the invention.

A further aspect of the invention provides an agricultural machine comprising the system or control system of any preceding aspect of the invention.

In a further aspect of the invention there is provided a method of mapping the distribution of residue material in an environment in which one or more agricultural machines are operable, the method comprising: receiving sensor data from one or more sensors of a sensing arrangement mounted or otherwise coupled to an agricultural machine operating within the environment, the sensor data being indicative of residue material spread by a spreader tool of the agricultural machine; determining, from the sensor data, a local distribution of residue material associated with the spreader tool; and updating a map of a global distribution of residue material across the environment in dependence on the local material distribution determined from the sensor data and the location of the agricultural machine, wherein the map comprises a grid-based map having a plurality of cells corresponding to sub-regions within the environment; and wherein a value associated with each cell is representative of a measure of residue material present within the corresponding sub-region.

The method may comprise setting the value of each cell in dependence on a harvested state of the field. For example, this may comprise setting the value of each cell at a base level, e.g. "0", for unharvested crop, or prior to the beginning of a harvesting operation.

The method may comprise incrementing the value of one or more cells of the map in dependence on the local material distribution. This may comprise incrementing the value of each cell corresponding to a sub-region where residue material is determined to have been spread into during a harvesting operation performed by the agricultural machine. The method may comprise incrementing the value of the cell(s) each time material is determined to have been spread, which may occur multiple times during an operation—e.g. during a pass of an adjacent crop row.

The method may comprise incrementing the value of the cell(s) by a predetermined amount for each determination that material has been spread into the corresponding sub-region of the environment. This may include incrementing the value by 1, for example. In some embodiments, the method may comprise incrementing the value of the cell(s) by an amount proportional to an amount of material determined to have been spread into the corresponding sub-region of the environment.

The method may comprise controlling one or more operating parameters of the agricultural machine or components thereof in dependence on the mapped distribution. For example, the method may comprise controlling one or more operating parameters related to the spreading of material from the machine, e.g. of a spreader tool of the machine, to control when material is distributed therefrom. In embodiments, the method may comprise preventing distribution of material as the agricultural machine passes areas of the environment corresponding to sub regions where material has previously been spread, for example for sub-regions corresponding to cell(s) having a value above a threshold. This may advantageously prevent overlapping of material spread to prevent or at least reduce areas of significant residue material build up.

In embodiments, the method may comprise controlling operation of a user interface, e.g. a display means, to provide information, for example to an operator of the agricultural machine corresponding to the mapped global distribution. This may comprise providing a graphical representation of the mapped distribution. The graphical representation may comprise a two-dimensional map of the environment with the sub-regions of the environment indicated. The sub-regions may be highlighted in colours, shades and/or patterns. For example, the sub-regions may be indicated in the representation with a colour which is dependent on the value of the corresponding cell of the mapped distribution. This may comprise a colour-scale corresponding to values between minimum and maximum values of the cells. Advantageously, the representation may provide an easily interpretable guide for an operator indicative of regions with higher and lower levels or residue build up. This may be used by an operator or a further control system for controlling one or more subsequent agricultural operations, such as corrective or collection operations.

The user interface may comprise a user interface of the agricultural machine, such as a user terminal provided in the machine, e.g. in an operator cab of the machine. The user interface may comprise a display on a remote device, such as a smartphone, tablet computer, computer or the like. The user interface may comprise a user terminal on one or more further machines operating in the environment. For example, the information relating to the mapped distribution may in this manner be provided to an operator of a further machine to inform subsequent agricultural operation.

The method may comprise obtaining information relating to the location of an associated agricultural machine within or with respect to the mapped environment. The method may comprise updating the mapped global distribution in dependence on the location of the agricultural machine.

The method may comprise determining an orientation of the agricultural machine within the environment.

The method may be performable utilising a distributed system. For example, one or more components of the system may be located off-board from the agricultural machine. This may include a storage means having the mapped distribution stored therein. For example, the system may include a remote storage means, such as a remote server housing the mapped distribution.

There may be multiple agricultural machines, each comprising one or more sensors for obtaining sensor data. Each of the multiple agricultural machines may be communicable with a central processing means having the one or more controllers for performing the processing steps of the invention.

In a further aspect of the invention there is provided computer software comprising computer readable instructions which, when executed by one or more processors, causes performance of the method of the preceding aspect of the invention.

A further aspect of the invention provides a computer readable storage medium comprising the computer software of the preceding aspect of the invention. Optionally, the storage medium comprises a non-transitory computer readable storage medium.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
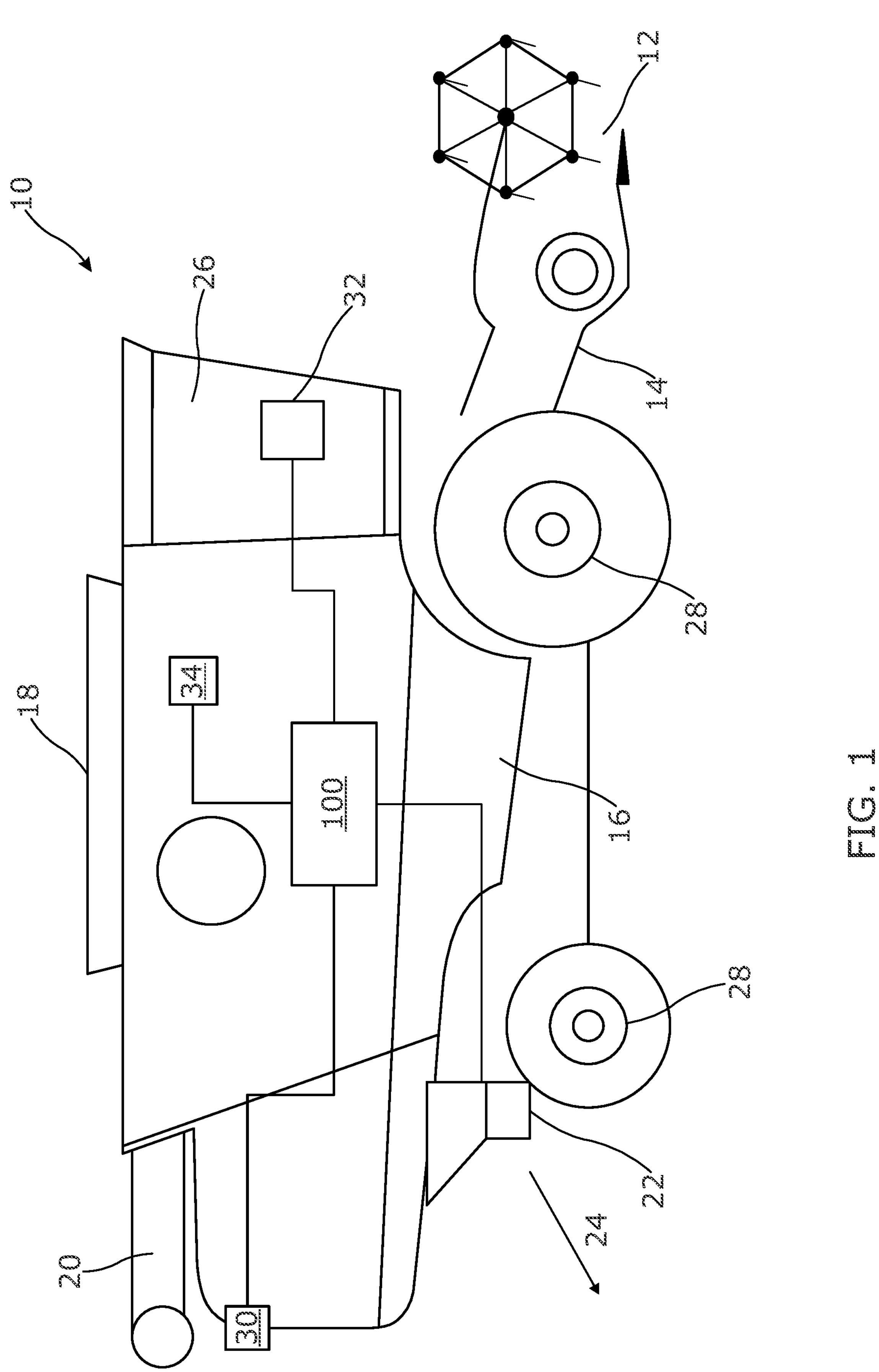
FIG. 1 is a schematic side cross-sectional view of an agricultural harvester embodying aspects of the invention.

FIG. 1 illustrates an agricultural machine, and specifically a combine 10, embodying aspects of the present invention.

The combine 10 is coupled to a header 12 which is operable, in use, to cut and gather a strip of crop material as the combine 10 is driven across a field/area to be harvested during a harvesting operation. A conveyor section 14 conveys the cut crop material from the header 12 into a crop processing apparatus 16 operable to separate grain and non-grain (i.e. material other than grain (MOG)) as will be appreciated. It is noted here that apparatus for separating grain and non-grain material are well-known in the art and the present invention is not limited in this sense. The skilled person will appreciate that numerous different configurations for the crop processing apparatus may be used as appropriate. Clean grain separated from the cut crop material is collected in a grain bin 18, which may be periodically emptied, e.g. into a collection vehicle, storage container, etc. utilising unloading auger 20. The remaining non-grain material (MOG)/residue is separately moved to a spreader tool 22 which is operable in use to eject the non-grain material or MOG from the rear of the combine 10 and onto the ground. In FIG. 1, this is represented by arrow 24 which illustrates the MOG being ejected rearwards from the combine 10. It will be appreciated that in some embodiments the combine 10 may also include a chopper tool positioned, for example, between the crop processing apparatus 16 and the spreader tool 22 and operable, in use, to cut the MOG/residue before it is spread by the spreader tool 22.

The combine 10 also typically includes, amongst other features, an operator cab 26, wheels 28, engine (not shown) and a user interface 32.

As will be discussed in detail herein, the combine 10 additionally includes a sensor 30 mounted to the rear of the combine 10 and having a sensing region rearwards of the combine 10 covering the area in which residue material is spread by the spreader tool 22. The sensor in the illustrated embodiment comprises a camera, although other types of imaging sensor may be used, and/or use of a transceiver type sensor is also envisaged, such as a LIDAR, RADAR or ultrasonic sensor, for example. The sensor 30 is used, by a control system 100 of the combine 10 to determine one or more characteristics of a distribution of material associated with the spreader tool 22, hereinafter referred to as a local distribution. This can include the position of residue material relative to the combine 10, and/or a measure of an amount of material spread by the spreader tool 22 and the location of that material within the environment. As discussed herein, the local distribution determined using sensor 30 is used to update a map of a global distribution of residue material across the environment as a whole.

Figure 2:
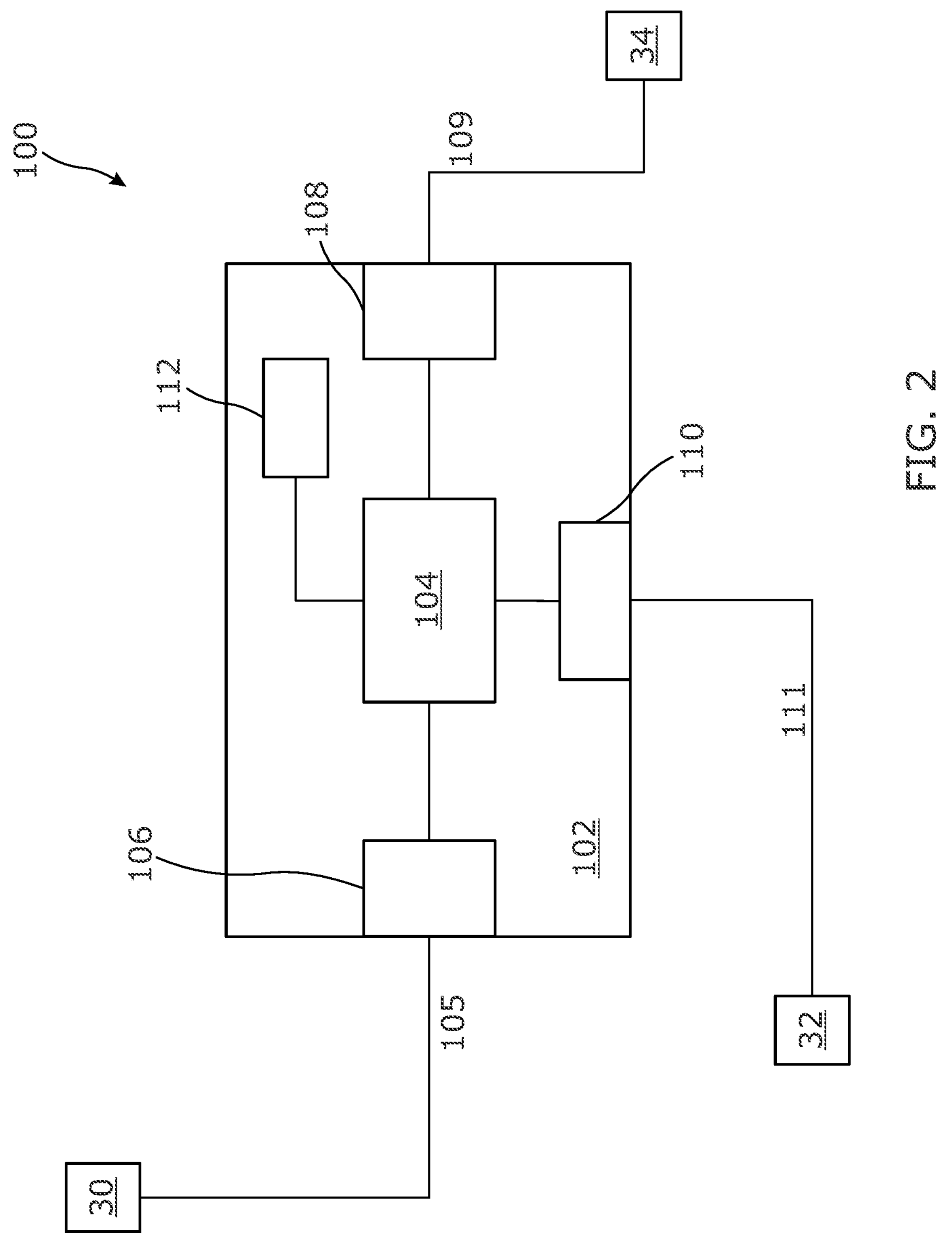
FIG. 2 is a schematic view of an embodiment of a control system of the invention.

FIG. 2 illustrates the control system 100 further. As shown, control system 100 comprises a controller 102 having an electronic processor 104, an electronic input 106 and electronic output 110 and transceiver module 108. The processor 104 is operable to access a memory 112 of the controller 102 and execute instructions stored therein to perform the steps and functionality of the present invention discussed herein, e.g. by controlling the user interface 32, to provide a representation to an operator of the combine 10 illustrative of the determined global residue material distribution.

The processor 104 is operable to receive sensor data via input 106 which, in the illustrated embodiment, takes the form of input signals 105 received from the sensor 30. Utilising this data, the processor 104 is configured to analyse the data and extract therefrom a measure of a local material distribution associated with the spreader tool 22. In practice, this may involve determining a measure of an amount of residue material being spread in a central measurement region corresponding to the region defined by the width of the combine 10 (or header 12), and/or an amount of residue material being spread left or right of the combine 10, e.g. into adjacent standing crop or into an adjacent crop row, such as the row previously harvested. Analysis of the sensor data to extract the local residue distribution falls outside the scope of the present invention and the invention is not limited in this sense.

The processor 104 is also operably coupled to a positioning module 34. The positioning module 34 forms part of a Global Navigation Satellite System (GNSS) and is operable to provide information relating to the location of the combine 10 within the mapped environment. Utilising the location of the combine 10, the local distribution determined using sensor data from the sensor 30 can be related to a global distribution across the entire environment.

Output 110 is operably coupled to the user interface 32 of the combine 10. Here, the control system 100 is operable to control operation of the user interface 32, e.g. through output of control signals 111 in order to display operational data to an operator of the combine 10 relating to the operation of the control system 100. Specifically, the control system 100 is operable to control the user interface to display to the operator a graphical representation of a map of the global distribution of the MOG across the environment.

Figure 3:
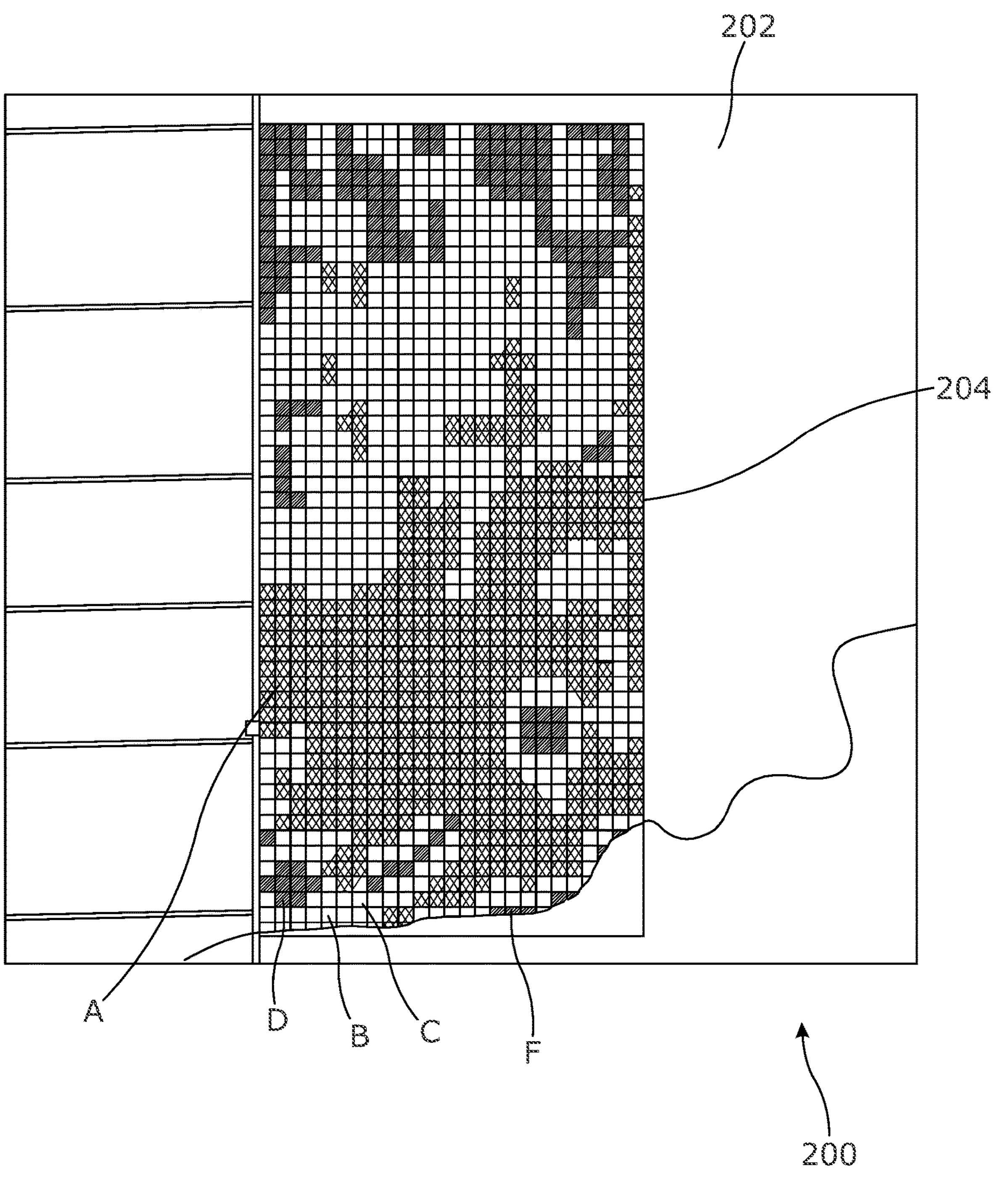
FIG. 3 illustrates a graphical representation illustrating aspects of the present invention.

FIG. 3 illustrates the operational use of the invention further.

Specifically, FIG. 3 shows a representation 204 of the mapped global distribution of residue material within an environment 202 formed using the present invention. This is shown as an image 200 on a user interface, e.g. display 32 in the operator cab of the combine 10.

The representation 204 is a grid-based map of the global distribution of residue material within the environment 202, and specifically within field F. The grid separates the environment 202 into a plurality of cells corresponding to sub-regions of the environment which are substantially square (except at the boundaries of the environment 202), and each of a predefined area. Each of the cells is assigned a value indicative of a measure of residue material lying in the corresponding sub-region. The processor 104 is operable to set the value of each cell at a base level, e.g. "0", for unharvested crop prior to the beginning of a harvesting operation. This is based on the assumption that there would be no or a minimal level of residue material present in the field prior to the harvesting operation.

As discussed herein, the processor 104 is operable to determine a local residue material distribution. Based on this, and with knowledge of the location of the combine 10 within the environment as determined via positioning module 34, a determination is made on a measure of residue material being spread into the sub-regions corresponding to the location of the combine 10. In turn, the processor 104 is configured to increment the value of the cells of the map corresponding to those sub-regions where material is being spread. In the illustrated embodiment, this includes incrementing the value of the relevant cells by a predetermined amount, here by 1 each time material is determined to have been spread into the corresponding sub-region. In an extension of the method the processor 104 is configured to increment the value of the cell(s) by an amount proportional to an amount of material determined to have been spread into the corresponding sub-region of the environment, although in such embodiments the processor 104 is configured to determine both the location and a measure of an amount of material being spread at any given time. This may be determined through further analysis of the sensor data, e.g. looking at density of material from the sensor data, and/or further sensors on the combine 10, such as a material flow sensor associated with the spreader tool 22.

As shown, the cells of the representation 204 are color coded. This is coded based on the value of each cell, incremented by a factor in a manner discussed herein based on the local material distribution determined by the processor 104. In the illustrated embodiment, a value of 0, corresponding to sub-regions of unharvested crop may be represented by coloring the associated cell, A, in green. A value of 1, corresponding to a sub-region where material has been spread once may be represented by coloring the associated cell, B, in yellow. A value of 2, corresponding to a sub region where material has been spread twice may be represented by coloring the associated cell, C, in orange. A value of 3, corresponding to a sub-region where material has been spread three times may be represented by coloring the associated cell, D, in red. In this manner, a representation 204 is produced which an operator may view and quickly determine areas within the field F where there is potentially significant build up of residue material. This can be used to inform later harvesting operations, e.g. control over the speed and operation of further machines when operating in those areas, or indeed in some instances to perform a corrective action to make the distribution more uniform in those areas.

The representation 204 is displayed here as an overhead map of the field F in which the combine 10 is operating, or has operated, and is presented on the user interface 32 of the combine 10. However, it will be appreciated that the representation may be stored remotely, or be sent over a communication channel, such that it may be viewed on other interfaces, including on a remote device or user terminal of a further machine operating or operable in the field F.

It is noted here that the illustrated embodiments show a control system 100 housed within combine 10. However, it will be appreciated that the control system 100 could be configured as a distributed system, with one or more components housed remotely, e.g. on further agricultural machines operating within the environment, on a remote server or the like. In a presently preferred embodiment, the control system 100 is communicable with a remote server where the global distribution and the map thereof is stored and is accessible to multiple different operators.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

It will be appreciated that the above embodiments are discussed by way of example only. Various changes and modifications can be made without departing from the scope of the present application.

The invention claimed is:

1. A system for mapping the distribution of residue material in an environment, the system comprising:

an agricultural machine operable in the environment, the agricultural machine comprising a spreader tool;

at least one sensor mounted in a sensing arrangement to the agricultural machine;

a grid-based map of a global distribution of the residue material in the environment, wherein the grid-based map comprises a plurality of cells, each of the plurality of cells corresponding to predefined sub-regions of the environment and having a value representative of a measure of the residue material spread within the corresponding predefined sub-regions; and at least one controller configured to:

receive sensor data from the at least one sensor indicative of the residue material spread by the spreader tool of the agricultural machine;

determine, from the sensor data, a local distribution of the residue material associated with the spreader tool; and update the grid-based map of the global distribution of the residue material in the environment based on the local material distribution determined from the sensor data and a location of the agricultural machine, the grid-based map being updated by incrementing the value of at least one of the plurality of cells by a predetermined amount for each determination that the residue material has been spread within the corresponding predefined sub-regions of the environment.

2. The system of claim 1, wherein each of the plurality of cells corresponding to the predefined sub-regions within the environment are of a given area of the environment.

3. The system of claim 1, wherein the at least one controller is operable to set the value of each of the plurality of cells based on a harvested state of the corresponding predefined sub-regions of the environment.

4. The system of claim 1, wherein the at least one controller is operable to increment the value of the plurality of cells based on the local material distribution.

5. The system of claim 4, wherein the at least one controller is operable to increment the value of the cells by 1.

6. The system of claim 4, wherein the at least one controller is operable to increment the value of each of the plurality of cells by an amount proportional to the local distribution of the residue material into the corresponding predefined sub-regions of the environment.

7. The system of claim 1, wherein the at least one controller is operable to control at least one operating parameter of the agricultural machine based on the mapped global distribution of the material.

8. The system of claim 7, wherein the at least one controller is operable to prevent distribution of the material as the agricultural machine passes areas of the environment corresponding to the predefined sub-regions where the material has previously been spread for the predefined sub-regions corresponding to each of the plurality of cells where the value is above a threshold.

9. The system of claim 1, wherein the at least one controller is further configured to control operation of a user interface to provide a graphical representation of the mapped global distribution.

10. The system of claim 9, wherein the graphical representation comprises a two-dimensional map of the environment with the predefined sub-regions of the environment indicated.

11. The system of claim 10, wherein the predefined sub-regions are indicated in the graphical representation with a color based on the value of each of the plurality of cells.

12. The system of claim 9, wherein the user interface comprises at least one of the following:

a user interface of the agricultural machine;

a display on a remote device; and a user terminal on at least one further machine operating in the environment.

13. The system of claim 1, wherein the sensing arrangement comprises at least one of the following:

an image sensor; and a transceiver type sensor, having a transmitting component for transmitting a measurement signal and a receiving component for receiving reflected measurement signals.

14. The system of claim 1, further comprising a position module, the position module being operable to provide information relating to a location of an associated agricultural machine in or with respect to the environment.

15. The system of claim 1, further comprising an inertial measurement unit used to determine an orientation of the agricultural machine in the environment.

16. The system of claim 1, further comprising multiple agricultural machines, each comprising at least one sensor for obtaining sensor data, wherein each of the multiple agricultural machines is communicable with a central processing unit having the at least one controller.

17. The system of claim 1, wherein the at least one controller is operable to set the value of each of the plurality of cells at a base level of 0 for unharvested crop or prior to the beginning of a harvesting operation.

18. The system of claim 2, wherein each of the predefined sub- regions comprise an area of at least 1 $m^2$.

* * * * *